US012511231B2

(12) United States Patent
Nagahara (10) Patent No.: US 12,511,231 B2
(45) Date of Patent: Dec. 30, 2025

(54) MEMORY SYSTEM AND CONTROL METHOD (71) Applicant: Kioxia Corporation, Tokyo (JP)

(72) Inventor: Tadashi Nagahara, Tokyo (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/786,782

(22) Filed: Jul. 29, 2024

(65) Prior Publication Data
US 2025/0045199 A1 Feb. 6, 2025

(30) Foreign Application Priority Data

Jul. 31, 2023 (JP) ................. 2023-124524

(51) Int. Cl.
G06F 12/02 (2006.01)
(52) U.S. Cl.
CPC .. *G06F 12/0246* (2013.01); *G06F 2212/7205* (2013.01)
(58) Field of Classification Search
CPC ............... G06F 3/0656; G06F 12/0868; G06F 2212/214; G06F 2212/7203; G06F 2212/7211; G06F 3/061; G06F 12/0804; G06F 3/0605; G06F 12/0891; G06F 12/1018; G06F 2212/2022; G06F 3/0614; G06F 3/0641; G06F 12/0238; G06F 12/0276; G06F 2212/7207; G06F 12/0246; G06F 2212/7205
See application file for complete search history.

(56) References Cited

U.S. PATENT DOCUMENTS

| 2012/0030413 | A1 | 2/2012 | Miyagawa et al. |
| 2014/0032817 | A1* | 1/2014 | Bux ..................... G06F 12/0261 711/E12.008 |
| 2017/0168929 | A1* | 6/2017 | Kanno ................ G06F 12/0246 |
| 2022/0308789 | A1* | 9/2022 | Nagahara .............. G06F 3/0679 |

FOREIGN PATENT DOCUMENTS

| JP | 2012-033002 A | 2/2012 |
| JP | 2017-111476 A | 6/2017 |
| JP | 2019-212099 A | 12/2019 |

* cited by examiner

*Primary Examiner* — Tasnima Matin
(74) *Attorney, Agent, or Firm* — Foley & Lardner LLP (57) ABSTRACT A controller is configured to execute a garbage collection operation on a nonvolatile memory including blocks, which includes calculating a write amplification; calculating a first threshold changing as a number of first blocks changes based on a number of first blocks storing valid data; increasing the first threshold when the calculated write amplification is less than a target value of the write amplification, decreasing the first threshold when the calculated write amplification is greater than the target value; specifying a valid data ratio indicating a ratio of a total amount of valid data to a total amount of data able to be stored in one block for each of the first blocks; selecting each block with the corresponding valid data ratio less than the first threshold from the first blocks; and setting each selected block to a free block by copying valid data stored therein to a copy destination block.

18 Claims, 10 Drawing Sheets

MEMORY SYSTEM AND CONTROL METHOD

CROSS-REFERENCE TO RELATED APPLICATION

This application is based upon and claims the benefit of priority from Japanese Patent Application No. 2023-124524, filed Jul. 31, 2023, the entire contents of which are incorporated herein by reference.

FIELD

Embodiments described herein relate generally to a memory system including a nonvolatile memory and a method of controlling the nonvolatile memory.

BACKGROUND

In recent years, memory systems including nonvolatile memories have widely spread. For example, a NAND flash memory is commonly used as a solid-state drive (SSD) in a memory system.

A NAND flash memory includes a plurality of blocks that are minimum units of a data erasing operation. A controller of a memory system executes a garbage collection (GC) operation to recover the number of free blocks that can be used in writing of data.

When a frequency at which a GC operation is executed is too high (or the number of free blocks made in a single GC operation is too large), a lifetime of a memory system may be shortened due to deterioration in write amplification. Conversely, when a frequency at which a GC operation is executed is too low (or the number of free blocks made in a single GC operation is too small), a process for a write command received from a host may not be immediately started due to a shortage of free blocks, which may deteriorate performance of the memory system.

DETAILED DESCRIPTION

Embodiments provide a memory system and a control method capable of executing a GC operation appropriately.

In general, according to one embodiment, a memory system connectable to a host includes a nonvolatile memory and a controller. The nonvolatile memory includes a plurality of blocks, each of the blocks being a unit of a data erasing operation. The controller is coupled to the nonvolatile memory and configured to control the nonvolatile memory and execute a garbage collection operation on the nonvolatile memory. When the controller executes the garbage collection operation, the controller is configured to calculate a write amplification indicating a ratio of a total amount of data written in the nonvolatile memory to a total amount of data written in the nonvolatile memory that is responsive to a request from the host; calculate a first threshold that changes as a number of first blocks changes based on a number of first blocks storing at least valid data; increase the first threshold when the calculated write amplification is less than a target value of the write amplification, and decrease the first threshold when the calculated write amplification is greater than the target value; specify a valid data ratio indicating a ratio of a total amount of valid data to a total amount of data that is able to be stored in one block for each of the first blocks; select each block with the corresponding valid data ratio less than the first threshold from the first blocks; and set each of the selected blocks to a free block by copying valid data stored in each of the selected blocks to a copy destination block.

Hereinafter, an embodiment will be described with reference to the drawings.

Figure 1:
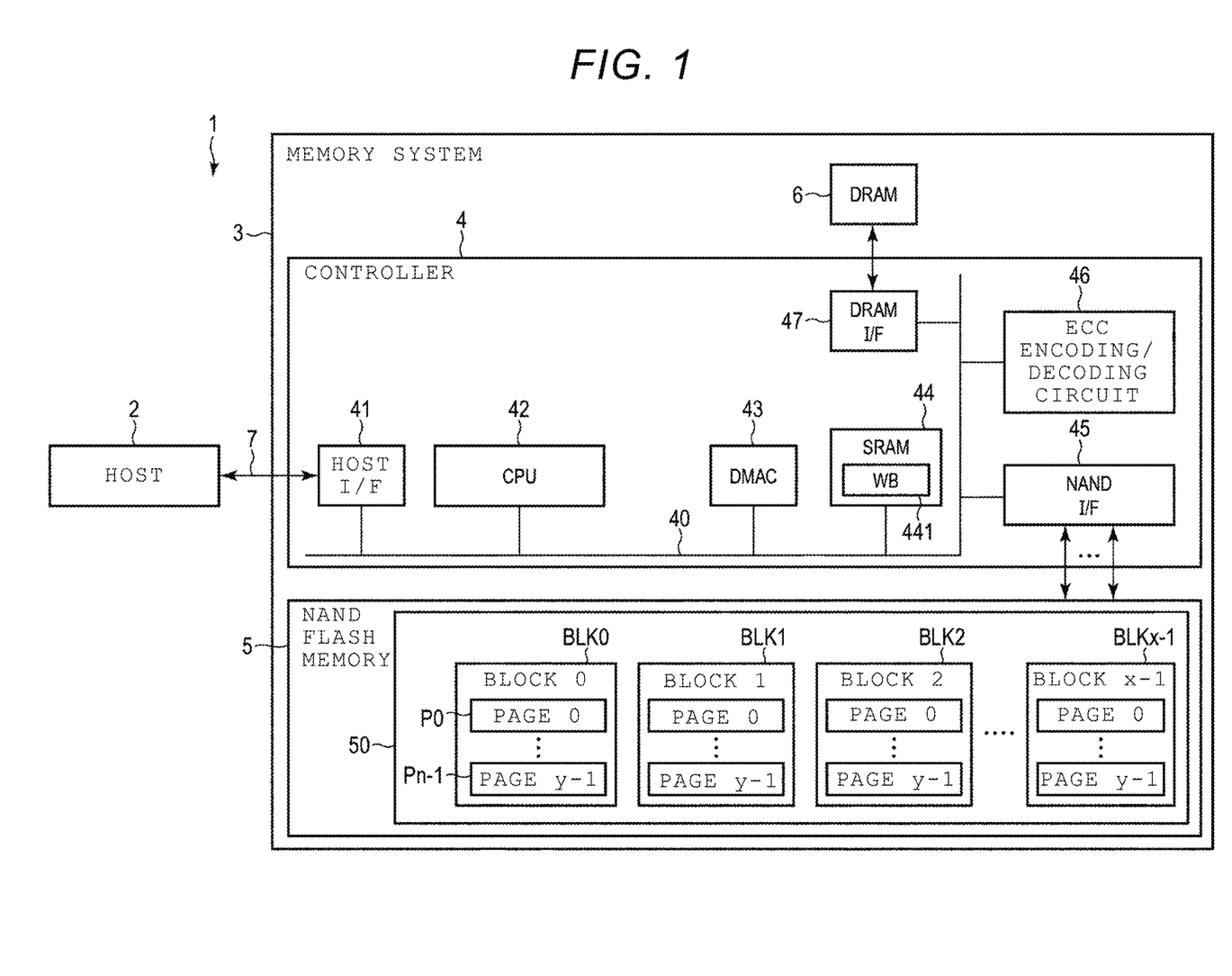
FIG. 1 is a block diagram illustrating a configuration example of an information processing system including a memory system according to an embodiment.

FIG. 1 is a block diagram illustrating a configuration example of an information processing system 1 including a memory system 3 according to an embodiment. The memory system 3 according to the embodiment is a storage device that includes a nonvolatile memory.

The information processing system 1 includes a host (host device) 2 and the memory system 3. The host 2 and the memory system 3 can be connected via a bus 7.

The host 2 is an information processing device. The host 2 is, for example, a personal computer, a server computer, or a portable terminal. The host 2 accesses the memory system 3. Specifically, the host 2 transmits a write command that is a command for requesting data to be written into the nonvolatile memory to the memory system 3. The host 2 transmits a read command that is a command for requesting data to be read from the nonvolatile memory to the memory system 3. The host 2 transmits a disabling command that is a command for requesting data to be disabled to the memory system 3. An example of the disabling command is an un-mapping command or a trimming command.

The memory system 3 is a semiconductor storage device that is able to be connected to the host 2. The memory system 3 is implemented by, for example, an embedded multimedia card (eMMC), a solid-state drive (SSD), or the like. The memory system 3 includes, for example, a NAND flash memory 5 that is an example of a nonvolatile memory. The memory system 3 writes data into the nonvolatile memory. The memory system 3 reads data from the nonvolatile memory.

Communication between the memory system 3 and the host 2 is executed via the bus 7. The bus 7 is mainly used to transmit data and an input/output command (I/O command) from the host 2 to the memory system 3 and transmit data and a response from the memory system 3 to the host 2. The I/O command is a command for writing or reading data into or from the nonvolatile memory. Examples of the I/O command include a write command for requesting data to be written into the nonvolatile memory and a read command for requesting data to be read from the nonvolatile memory.

Next, an internal configuration of the memory system 3 will be described. The memory system 3 includes a controller 4 and the NAND flash memory 5. The memory system 3 may further include a dynamic random access memory (DRAM) 6.

The controller 4 is a memory controller. The controller 4 is, for example, a control circuit such as a system-on-a-chip (SoC). The controller 4 is electrically connected to each of the NAND flash memory 5 and the DRAM 6. The controller 4 processes various commands received from the host 2. The controller 4 executes an operation of writing data on the NAND flash memory 5 by processing a write command. The controller 4 executes an operation of reading data from the NAND flash memory 5 by processing a read command. When a time during which there is no access from the host 2 reaches a certain time, the controller 4 causes the memory system 3 to transition to an idle state. Alternatively, the controller 4 causes the memory system 3 to transition to the idle state in response to a request from the host 2. The memory system 3 in the idle state is waiting for a request from the host 2. For example, the memory system 3 decreases power consumption in the memory system 3 during the idle state. Alternatively, the memory system 3 can execute, for example, a garbage collection operation or the like during the idle state.

The controller 4 is connected to be able to communicate with the DRAM 6. The controller 4 executes writing of data on the DRAM 6 and reading of data from the DRAM 6.

The NAND flash memory 5 is a nonvolatile memory. The NAND flash memory 5 is, for example, a flash memory that has a 3-dimensional structure. The NAND flash memory 5 includes a memory cell array 50. The memory cell array 50 includes a plurality of memory cells arranged in a matrix configuration. The memory cell array 50 in the NAND flash memory 5 includes a plurality of blocks BLK0 to BLKx−1. Each of the blocks BLK0 to BLKx−1 is a unit of a data erasing operation of erasing data. The data erasing operation is also referred to as an erasure operation or simply an erasing operation. Each of the blocks BLK0 to BLKx−1 is also referred to as a physical block, a flash block, or a memory block.

Each of the blocks BLK0 to BLKx−1 includes a plurality of pages (here, pages P0 to Py−1). Each page includes a plurality of memory cells connected to a same word line. Each of the pages P0 to Py−1 is a unit of a data write operation and a data read operation.

Some blocks among the blocks BLK0 to BLKx−1 can be used as, for example, a triple level cell block (TLC block). In an operation of writing data in each TLC block, data corresponding to three pages is written in a plurality of memory cells connected to the same word line by writing 3-bit data per memory cell.

Each of other blocks among the blocks BLK0 to BLKx−1 can be used as, for example, a single level cell block (SLC block). In an operation of writing data in each SLC block, data corresponding to one page is written in a plurality of memory cells connected to the same word line by writing 1-bit data per memory cell.

A storage density per memory cell in the SLC block is 1 bit (that is, one page per word line) and a storage density per memory cell in the TLC block is 3 bits (that is, three pages per word line). Therefore, even when the number of SLC blocks is the same as the number of TLC blocks, an amount of data that can be stored by using the TLC block is three times a total amount of data that can be stored when the SLC block is used. That is, by preferentially storing data in the TLC block than storing data in the SLC block, it is possible to effectively utilize resources of the memory system 3.

On the other hand, a write speed and a read speed of data on and from the NAND flash memory 5 are slower as the storage density is higher, and are faster as the storage density is lower. Accordingly, times necessary to read and write data from and into the TLC block are longer than times necessary to read and write data from and into the SLC block.

Therefore, in the memory system 3, by writing data associated with a write command received from the host 2 in the SLC block, it is possible to process the write command faster than when the data is written in the TLC block. Thereafter, by copying data stored in the SLC block to the TLC block, it is possible to effectively utilize resources of the memory system 3.

However, a copy operation causes a data write operation on the NAND flash memory 5 in addition to a data write operation requested from the host 2. Therefore, the copy operation worsens write amplification (WAF) in the memory system 3 and consequently shortens a lifetime of the NAND flash memory 5. The write amplification is also referred to as a write efficiency value. The write amplification indicates a ratio of a total amount of data written in the NAND flash memory 5 to a total amount of data written in the NAND flash memory 5 in response to a request from the host 2.

Hereinafter, a mode in which data corresponding to three pages is written in a plurality of memory cells connected to the same word line is referred to as a first write mode, and a mode in which data corresponding to one page is written in a plurality of memory cells connected to the same word line is referred to as a second write mode. The first write mode is also referred to as a TLC mode. The second write mode is also referred to as an SLC mode. Each of the plurality of blocks included in the NAND flash memory 5 is, for example, any of a block dedicated for the first write mode and a block dedicated for the second write mode.

The DRAM 6 is a volatile memory. A part of a storage region of the DRAM 6 is used, for example, to temporarily store information used to manage the memory system 3. Another part of the storage region of the DRAM 6 can be used to temporarily store write data received from the host 2 or read data read from the NAND flash memory 5.

Next, an example of an inner configuration of the controller 4 will be described. The controller 4 includes a host interface (host I/F) 41, a CPU 42, a direct memory access controller (DMAC) 43, a static RAM (SRAM) 44, a NAND interface (NAND I/F) 45, an ECC encoding/decoding circuit 46, and a DRAM interface (DRAM I/F) 47. The units are connected to an internal bus 40.

The host interface 41 is an interface circuit that executes communication with the host 2. The host interface 41 receives, for example, an I/O command and data from the host 2. The host interface 41 transmits data and a response to the host 2.

The CPU 42 is a processor. The CPU 42 controls the host interface 41, the DMAC 43, the SPAM 44, the NAND interface 45, the ECC encoding/decoding circuit 46, and the DRAM interface 47. The CPU 42 loads a control program (firmware) stored in the NAND flash memory 5 or a ROM (not illustrated) into the SRAM 44 or the DRAM 6. The CPU 42 executes various processes by executing the control program (firmware).

The CPU 42 executes, for example, management of data stored in the NAND flash memory 5 and management of blocks in the NAND flash memory 5 as a flash translation layer (FTL). The management of the data stored in the NAND flash memory 5 is, for example, management of mapping information that is information indicating a correspondent relation between each logical address and each physical address. The logical address is an address used by the host 2 to access the memory system 3. The logical address is, for example, a logical block address (LBA). The physical address is an address indicating a physical storage location in the NAND flash memory 5. In the NAND flash memory 5, writing of data in one page of a block can be executed only once per program/erasure cycle for the block. Therefore, the controller 4 writes update data corresponding to a certain logical address at another storage location rather than a storage location at which previous data corresponding to the logical address is stored. Therefore, the CPU 42 manages mapping between logical addresses and physical addresses using a logical-to-physical address translation table (L2P table) 61. Among the data stored in the NAND flash memory 5, data stored at a storage location indicated by a physical address mapped to a logical address is valid data. Conversely, data stored at a storage location indicated by a physical address not mapped to any logical address is invalid data. The CPU 42 manages a block storing at least valid data as an active block. The CPU 42 manages a block not storing valid data as a free block.

In the management of the blocks in the NAND flash memory 5, for example, a garbage collection operation is executed. In the garbage collection operation, the CPU 42 selects a specific active block as a garbage collection target block. The garbage collection target block is also referred to as a copy source block. The CPU 42 extracts only valid data stored in a block stored in the selected block and copies the extracted valid data to a copy destination block. Accordingly, all of the data stored in the selected garbage collection target block becomes invalid data. Accordingly, the selected block is a free block. The CPU 42 executes a data erasing operation on the block that became a free block. That is, the CPU 42 can restore the number of free blocks in the memory system 3 by executing the garbage collection operation.

The DMAC 43 is a circuit that executes direct memory access (DMA). The DMAC 43 executes data transmission between a memory (not illustrated) of the host 2 and the SRAM 44 or the DRAM 6.

The SRAM 44 is a volatile memory. A part of a storage region of the SRAM 44 can be used as, for example, a write buffer that temporarily stores write data received from the host 2. A part of the storage region of the SRAM 44 can also be used as, for example, a read buffer that temporarily stores data read from the NAND flash memory 5. In the SRAM 44, write and read speeds of data are faster than in the DRAM 6. Therefore, information of which a use frequency is high among information stored in the DRAM 6 may be temporarily stored in a part of the storage region of the SRAM 44.

The NAND interface 45 is an interface circuit that executes access to the NAND flash memory 5.

The NAND interface 45 is a circuit that controls the NAND flash memory 5. When the NAND flash memory 5 is configured by a plurality of NAND flash dies, the NAND interface 45 may be connected to each of the plurality of NAND flash dies via a plurality of channels.

The ECC encoding/decoding circuit 46 is a circuit that executes encoding of data and decoding of data. The ECC encoding/decoding circuit 46 executes an encoding process when data is written into the NAND flash memory 5. In the encoding process, the ECC encoding/decoding circuit 46 adds an error correction code (ECC) as a redundant code to data to be written. The ECC encoding/decoding circuit 46 executes a decoding process when data is read from the NAND flash memory 5. In the decoding process, the ECC encoding/decoding circuit 46 executes an error correction process on the data using the ECC added to the data read from the NAND flash memory 5.

The DRAM interface 47 is a circuit that controls the DRAM 6. The DRAM interface 47 stores data in the DRAM 6 and reads data stored in the DRAM 6.

Figure 2:
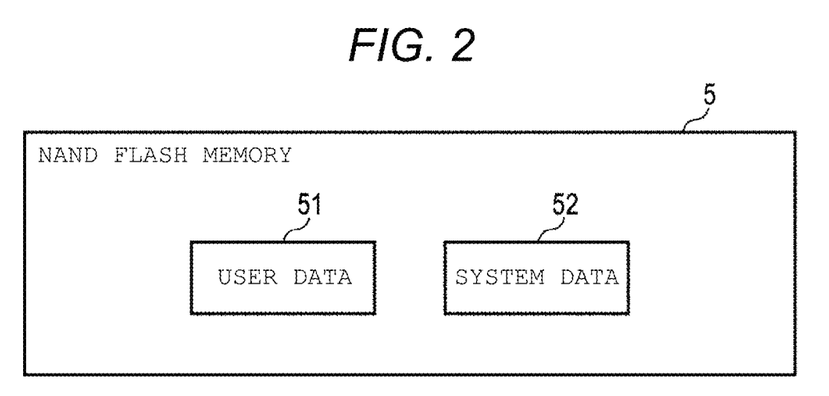
FIG. 2 is a block diagram illustrating a configuration example of a NAND flash memory in the memory system according to the embodiment.

Next, a configuration example of the NAND flash memory 5 will be described. FIG. 2 is a block diagram illustrating a configuration example of the NAND flash memory 5 in the memory system 3. A part of a storage region of the NAND flash memory 5 is used to store user data 51 and system data 52.

The user data 51 is data written in the NAND flash memory 5 based on a write command received from the host 2. The user data stored in the NAND flash memory 5 is broadly classified into valid data and invalid data. The valid data is data indicated by a physical address associated with a logical address and stored in a storage location in the NAND flash memory 5. The valid data is data that is likely to be read from the host 2 later. The invalid data is data indicated by a physical address not associated with a logical address and stored in a storage location in the NAND flash memory 5. The invalid data is data that is not likely to be read from the host 2 no longer.

The system data 52 is data used to manage the memory system 3. The system data 52 is also referred to as management information. The system data 52 includes health data. The health data is also referred to as, for example, smart health information. The health data includes information indicating a total amount of data written in the NAND flash memory 5.

Figure 3:
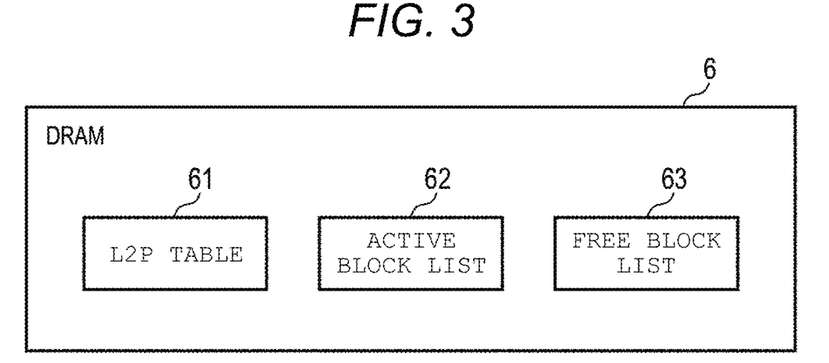
FIG. 3 is a block diagram illustrating a configuration example of a DRAM in the memory system according to the embodiment.

Next, a configuration example of the DRAM 6 will be described. FIG. 3 is a block diagram illustrating a configuration example of the DRAM 6 in the memory system 3 according to the embodiment. A part of a storage region of the DRAM 6 is used to store the L2P table 61, an active block list 62, and a free block list 63.

In the L2P table 61, mapping between each logical address and each physical address is managed for each predetermined size as in a cluster.

The active block list 62 is a list for managing active blocks that are blocks in which at least valid data is stored. In the active block list 62, a valid data ratio that is a ratio of a total amount of valid data to a total amount of data that can be stored in one block may be managed for each active block. In the active block list 62, a valid data ratio of each active block may be stored. The valid data ratio of each active block may be stored in the SRAM 44 instead of being stored in the active block list 62 of the DRAM 6. When the valid data ratio of each active block is managed, the controller 4 updates the valid data ratio of each active block in which data is rewritten whenever writing of data is executed. Alternatively, the valid data ratio of each active block may be calculated by the controller 4 whenever the garbage collection operation is executed.

The free block list 63 is a list for managing free blocks that are blocks in which valid data is not stored.

Figure 4:
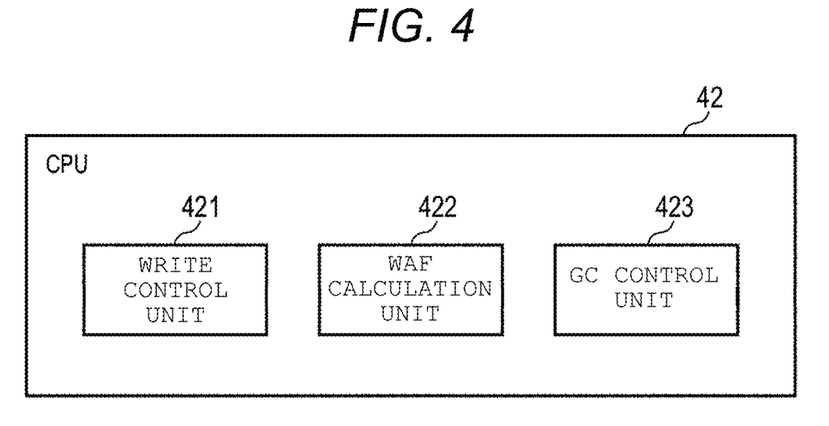
FIG. 4 is a block diagram illustrating a functional configuration example of a CPU in a controller of the memory system according to the embodiment.

Next, a functional configuration example of the CPU 42 will be described. FIG. 4 is a block diagram illustrating a functional configuration example of the CPU 42 in the controller 4 of the memory system 3 according to the embodiment. The CPU 42 includes a write control unit 421, a write amplification (WAF) calculation unit 422, and a garbage collection (GC) control unit 423. Processes by the write control unit 421, the WAF calculation unit 422, the GC control unit 423 may be processes executed by the CPU 42 executing firmware or may be processes by dedicated hardware.

The write control unit 421 controls an operation of writing data on the NAND flash memory 5. The write control unit 421 generates a program command that is an instruction to write data into the NAND flash memory 5 and issues the generated program command to the NAND interface 45. The write control unit 421 generates the program command in response to data becoming writable to the NAND flash memory 5.

The write control unit 421 receives a write command via the host interface 41. The write command is a command for designating at least a logical address corresponding to write data to be written into the NAND flash memory 5 and a size of the write data. The write control unit 421 receives the write data associated with the received write command from the host 2 and stores the received write data in a write buffer 441. When a total amount of valid data stored in the write buffer 441 reaches a minimum write size, the write control unit 421 determines a write destination storage location in a write destination block in which the write data is to be written and generates a program command for writing the write data at the write destination storage location. The program command is a command for designating a physical address indicating the write destination storage location and an address indicating a storage location on the write buffer 441 in which user data to be written is stored. The write control unit 421 issues the generated program command to the NAND flash memory 5 via a command queue (not illustrated) and the NAND interface 45. As such, the write control unit 421 writes the write data associated with the write command at the write destination storage location in the write destination block.

The write control unit 421 selects a write mode used for a data write operation based on a situation of the memory system 3. For example, the write control unit 421 selects the second write mode when the number of free blocks in the memory system 3 is greater than a threshold. Here, the write control unit 421 generates a program command when user data corresponding to one page is prepared in the write buffer 441. For example, the write control unit 421 selects the first write mode when the number of free blocks in the memory system 3 is equal to or less than a threshold. Here, the write control unit 421 generates a program command when user data corresponding to three pages is prepared in the write buffer 441. The program command for writing the user data corresponding to three pages into the NAND flash memory 5 may be transmitted at once or may be transmitted separately a plurality of times.

A data read operation of reading data written in the NAND flash memory 5 is controlled by a read control unit (not illustrated). The read control unit executes the data read operation based on a read command received from the host 2.

Here, the read control unit generates a read command to be transmitted to the NAND flash memory 5 via the NAND interface 45.

The WAF calculation unit 422 calculates a write amplification. The WAF calculation unit 422 starts a write amplification calculation operation in response to a start of a garbage collection operation.

The WAF calculation unit 422 first reads health data from the NAND flash memory 5. The WAF calculation unit 422 acquires a total amount of data written in the NAND flash memory 5 from the read health data. The WAF calculation unit 422 acquires a total amount of data written in the NAND flash memory 5 based on the write command received from the host 2, for example, from the read health data. The WAF calculation unit 422 may calculate the total amount of data written in the NAND flash memory 5 based on the write command received from the host 2 by using the total amount of data written in the NAND flash memory 5 acquired from the read health data.

The GC control unit 423 controls the garbage collection operation. The GC control unit 423 executes two types of garbage collection operations (a first garbage collection operation or a second garbage collection operation) according to the number of active blocks (or the number of free blocks) in the memory system 3.

When the memory system 3 transitions to an idle state, the GC control unit 423 determines whether the number of active blocks in the memory system 3 is within a first range. The first range is, for example, a range equal to or more than $n_{min}$ and equal to or less than $n_{max}$. Here, $n_{min}$ and $n_{max}$ are all natural numbers and $n_{min}$ is a value less than $n_{max}$. The GC control unit 423 executes the first garbage collection operation when the number of active blocks is within the first range. When the first garbage collection operation starts, the GC control unit 423 causes the WAF calculation unit 422 to calculate the WAF. The GC control unit 423 calculates a first threshold increasing as the number of active blocks in the memory system 3 increases. The first threshold is also referred to as Vcth. Specifically, Vcth is a percentage based on a value obtained by multiplying the WAF by a number obtained by dividing a power of the number of active blocks that has a number equal to or greater than 1 as an exponent by a power of the number of the plurality of blocks that has a number equal to or greater than 1 as an exponent. The GC control unit 423 compares the calculated threshold with the valid data ratio of each active block in the memory system 3. The GC control unit 423 selects each block in which the valid data ratio is less than Vcth from the active blocks. The GC control unit 423 sets each of the selected blocks to a free block by copying the valid data stored in each of the selected blocks to a copy destination block.

The GC control unit 423 executes a second garbage collection operation different from the first garbage collection operation when the number of free blocks in the memory system 3 is less than the threshold. For example, the GC control unit 423 sets the number of free blocks to be recovered. For example, the GC control unit 423 selects the active blocks in order from the active block in which the valid data ratio is low from the active blocks. The GC control unit 423 sets each of the selected blocks to a free block by copying the valid data stored in each of the selected blocks to a copy destination block. Here, the GC control unit 423 continues the second garbage collection operation until the number of free blocks is recovered by the set number.

Hereinafter, the first garbage collection operation is simply referred to as a garbage collection operation and the second garbage collection operation is also referred to as another garbage collection operation.

Figure 5:
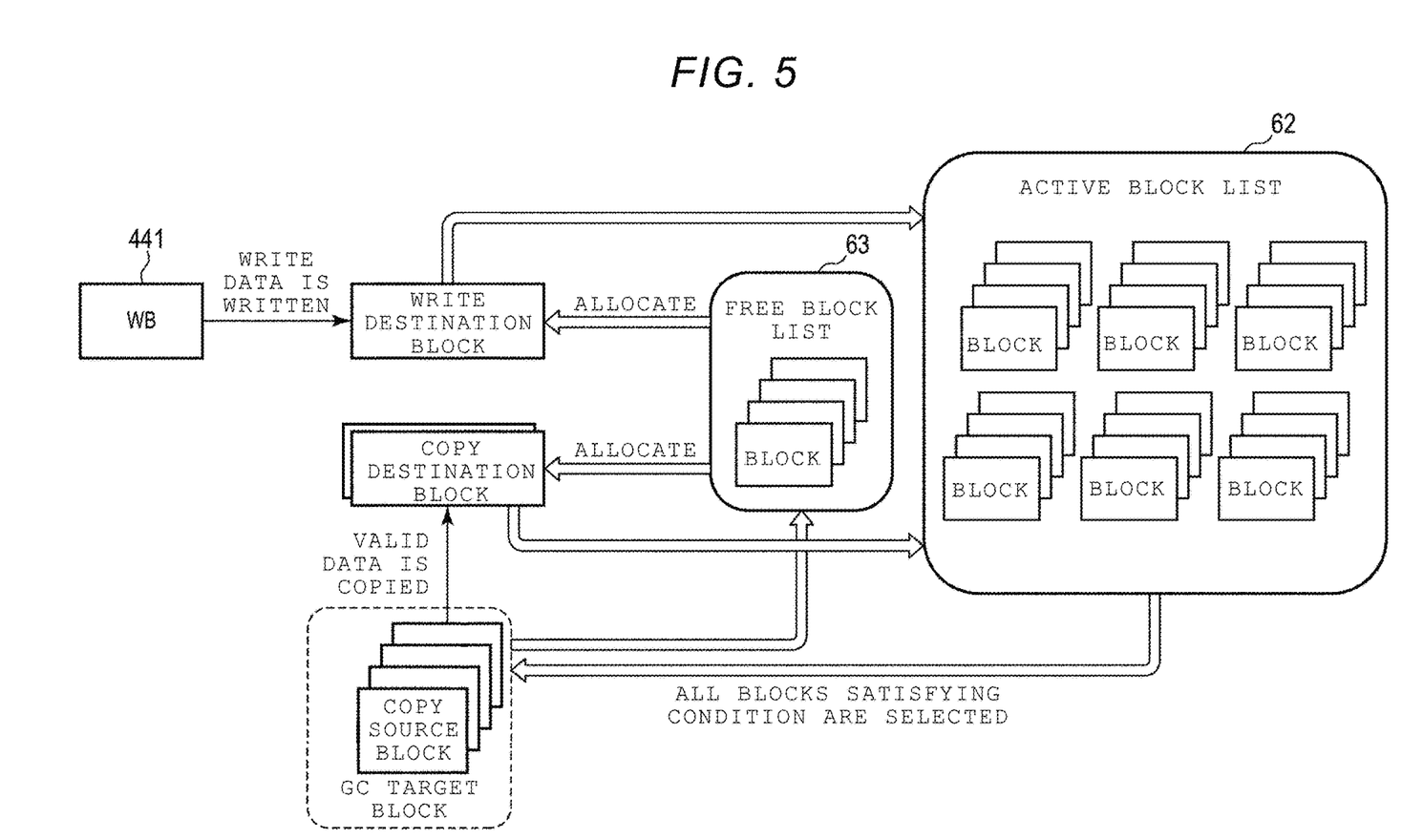
FIG. 5 is a diagram illustrating an example of a write operation and a garbage collection operation executed in the memory system according to the embodiment.

Next, a flow of data in the data write operation and the garbage collection operation will be described. FIG. 5 is a diagram illustrating an example of a write operation and a garbage collection operation executed in the memory system.

First, the data write operation will be described. The write control unit 421 receives the user data associated with the write command received from the host 2 and temporarily stores the received user data in the write buffer 441. The write control unit 421 writes the stored user data in a write destination block. When the writing is completed, the controller 4 transmits a completion response corresponding to the completed write command to the host 2.

When the user data is written and the write destination block thus enters a full state in which new user data cannot be written, the controller 4 releases allocation of the block as the write destination block and registers the block in the active block list 62. Alternatively, when the block can be allocated as the write destination block, the block may be registered in the active block list 62.

When the block cannot be allocated as the write destination block when a new data write operation is generated, the write control unit 421 selects any block in the free block list 63 and allocates the selected block as the write destination block. Here, the write control unit 421 may also refer to a program/erasure cycle of each free block. For example, the write control unit 421 selects a block that has a relatively long lifetime that is a block of which advance of the program/erasure cycle is slow and allocates the selected block as the write destination block.

Next, the garbage collection operation will be described. The GC control unit 423 selects all the blocks satisfying a condition that the valid data ratio is less than Vcth as garbage collection target blocks among the active blocks registered in the active block list 62. For example, the GC control unit 423 specifies the valid data ratio of each active block by calculating the valid data ratio of each active block in the garbage collection operation. Alternatively, the GC control unit 423 specifies the valid data ratio with reference to the valid data ratio of each active block managed in the memory system 3.

When there is no block satisfying the condition, the GC control unit 423 ends the garbage collection operation.

When there are one or more blocks satisfying the condition, the GC control unit 423 selects one or more blocks satisfying the condition as one or more garbage collection target blocks. The selected block is allocated as a copy source block. When there is no block allocated as the copy destination block, the GC control unit 423 selects one or more free blocks in the free block list 63 and allocates the selected free block as the copy destination block.

The GC control unit 423 copies the valid data stored in the garbage collection target block to the copy destination block. Accordingly, the valid data stored in the garbage collection target block becomes invalid data. The garbage collection target block in which all of stored data became invalid data is returned to the free block list 63 after the data erasing operation is executed. The data erasing operation on the block may be executed immediately before the block registered in the free block list 63 is allocated as a write destination block or a copy destination block.

As the copy destination block enters the full state by copying the data, the allocation to the copy destination block is released and the copy destination block is registered in the active block list 62. Alternatively, when the block is allocated as the copy destination block, the block may be registered in the active block list 62.

When the valid data is copied to the copy destination block, for example, the controller 4 writes the data into the copy destination block using the TLC mode. Then, as the block allocated as the copy destination block, a block corresponding to the TLC mode is selected. Here, when the valid data stored in the copy source block is data written using the SLC mode, the controller 4 can reduce the number of blocks used to store the data by copying the data to the copy destination block in the TLC mode.

However, copying of data to the copy destination block based on the garbage collection operation is writing of data on the NAND flash memory 5 other than writing of data on the NAND flash memory 5 based on a request from the host 2. Therefore, the WAF of the memory system 3 increases by executing copying of data based on the garbage collection operation.

Figure 6:
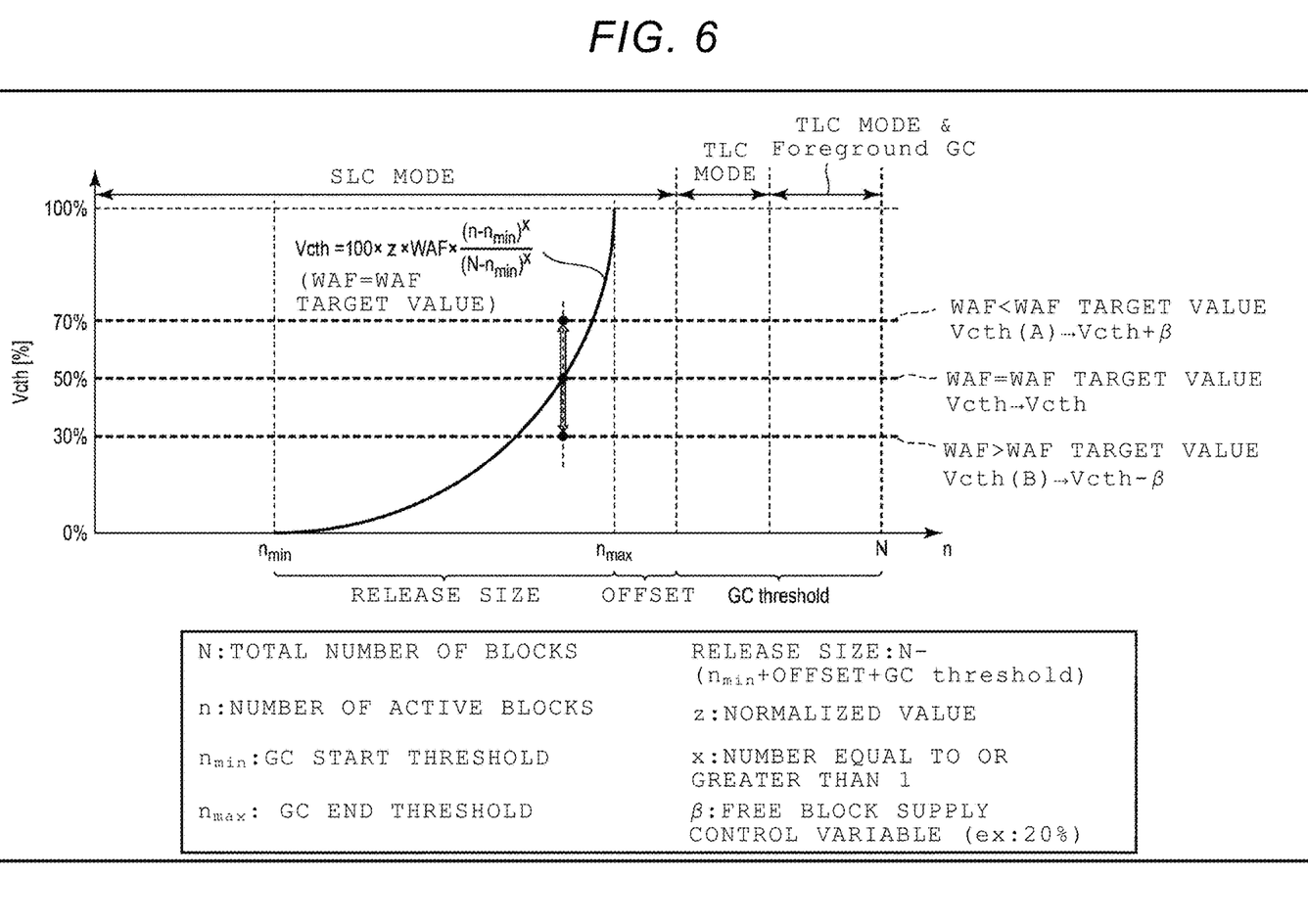
FIG. 6 is a diagram illustrating a relation between a first threshold and the number of active blocks in the memory system according to the embodiment.

Next, Vcth that is a threshold used for a garbage collection operation will be described. FIG. 6 is a diagram illustrating a relation between the first threshold and the number of active blocks in the memory system according to the embodiment.

In the graph illustrated in FIG. 6, the vertical axis represents a threshold (Vcth) used for the garbage collection operation. The horizontal axis represents n that is the number of active blocks in the memory system 3. Vcth is calculated by the following Formula 1.

$$Vcth = 100 \times z \times WAF \times (n - n_{min})^x / (N - n_{min})^x \qquad \text{Formula 1}$$

In Formula 1, WAF is a current write amplification of the memory system 3.

N indicates a total number of blocks managed in the memory system 3. N as the total number of blocks is a sum of the number of active blocks and the number of free blocks. That is, a number obtained by subtracting n as the number of active blocks from N as the total number of blocks indicates the number of free blocks.

$n_{min}$ is a garbage collection start threshold and indicates a value of the lower end of the first range.

$n_{max}$ is a garbage collection end threshold and indicates a value of the upper end of the first range.

A release size indicates the number of blocks corresponding to the first range. The release size can be indicated by N−($n_{min}$+offset+GC threshold). The offset is a grace period until another garbage collection operation starts after the number of active blocks exceeds $n_{max}$. The offset may not be set (for example, may be 0). The GC threshold is a threshold used to determine whether another garbage collection operation starts. The GC control unit 423 executes another garbage collection operation in response to the number of free blocks in the memory system 3 becoming equal to or less than the GC threshold.

z is a normalized value. Vcth is a value preset so that Vcth is within a percentage value. z is, for example, a fixed value during an operation of the memory system 3.

x is a number of 1 or more. x is set to, for example, a value of 2, 3, or the like.

β is a free block supply control variable. β is a value used to adjust Vcth according to the value of the WAF. β is, for example, 20%. A free block supply control variable used to adjust Vcth to a larger value and a free block supply control variable used to adjust Vcth to a smaller value may be set to different values.

While n as the number of active blocks is equal to or greater than 0 and less than $n_{max}$+offset, the write control unit 421 of the controller 4 executes writing of data on the NAND flash memory 5 using the SLC mode. While the write operation is executed using the SLC mode, the memory system 3 can process the write command received from the host 2 with a relatively low latency.

When n as the number of active blocks is equal to or greater than $n_{max}$+offset, the write control unit 421 of the controller 4 executes writing of data on the NAND flash memory 5 using the TLC mode. While the write operation is executed using the TLC mode, the memory system 3 can process the write command received from the host 2 with a relatively high latency compared to the case in which the write operation is executed using the SLC mode.

When the number of free blocks is less than the GC threshold, the GC control unit 423 executes another garbage collection operation. When the number of active blocks is equal to or greater than $n_{max}$+offset, the number of free blocks is equal to or less than the GC threshold. Therefore, the controller 4 executes another garbage collection operation when the TLC mode is used in the writing of data on the NAND flash memory 5. The GC control unit 423 executes another garbage collection operation in the background while the number of free blocks is less than the GC threshold and is equal to or greater than the threshold. That is, the GC control unit 423 executes another garbage collection operation when the writing of data based on the write command received from the host 2 is not executed. The threshold is a value less than the GC threshold.

While n as the number of active blocks is equal to or greater than $n_{max}$+offset and the number of free blocks is less than the threshold, the GC control unit 423 of the controller 4 executes another garbage collection operation in the foreground. Meanwhile, the memory system 3 executes another garbage collection operation in parallel with the writing operation based on the write command received from the host 2. Therefore, the memory system 3 processes the write command received from the host 2 with further higher latency compared to while only the writing operation is executed in the TLC mode.

While n as the number of active blocks is within the first range corresponding to the release size, the GC control unit 423 of the controller 4 executes the garbage collection operation whenever the memory system 3 enters the idle state.

Here, the WAF calculation unit 422 of the controller 4 calculates the WAF in the memory system 3. Then, the controller 4 calculates Vcth using the calculated WAF and n as the number of active blocks in the memory system 3.

In the garbage collection operation, the GC control unit 423 selects each block in which the valid data ratio is equal to or less than Vcth as the garbage collection target block. Therefore, as the value of the calculated Vcth is larger, more active blocks are selected as the garbage collection target blocks.

A curve drawn in the graph of FIG. 6 is a curve represented by $Vcth=100 \times z \times WAF \times (n-n_{min})^x/(N-n_{min})^x$ when WAF=WAF target value. Here, n is a value within the first range. That is, n is equal to or greater than $n_{min}$ and equal to or less than $n_{max}$. Since x is a number equal to or greater than 1, the value of Vcth is a value that becomes larger as n as the number of active blocks becomes larger.

Accordingly, the block in which the valid data ratio is low is selected as the copy source block while the number of active blocks in the memory system 3 is small. A block in which the valid data ratio is high is selected as the copy source block as the number of active blocks increases. That is, in the garbage collection operation, a block in which a ratio of valid data to be copied is low is preferentially selected as the copy source block and becomes a free block.

The GC control unit 423 calculates Vcth=50% in FIG. 6.

The GC control unit 423 compares the value of the WAF with the WAF target value and adjusts the calculated Vcth. When the WAF is equal to the WAF target value, the GC control unit 423 executes a subsequent garbage collection operation while maintaining Vcth=50%.

When the value of the WAF is less than the WAF target value, the GC control unit 423 adds β to the calculated Vcth. For example, Vcth is 70% (=50%+20%). Accordingly, compared to a case in which Vcth without adding β is used, the number of blocks selected as the copy source blocks can increase. Here, since the WAF of the memory system 3 is less than the WAF target value, an increase in a total amount of data to be copied is permitted.

When the value of the WAF is greater than the WAF target value, the GC control unit 423 subtracts β from the calculated Vcth. For example, Vcth is 30% (=50%-20%). Accordingly, the number of blocks selected as the copy source blocks can decrease. Here, since the total number of data to be copied decreases, the increase in the WAF is inhibited and the WAF of the memory system 3 easily approaches the WAF target value.

Accordingly, when the WAF of the memory system 3 is less than the WAF target value, Vcth is adjusted so that the WAF easily increases. When the WAF is greater than the WAF target value, Vcth is adjusted so that the increase in the WAF is inhibited. Accordingly, the controller 4 can control the WAF to not deviate from the WAF target value by adjusting Vcth.

Here, as the method of adjusting Vcth, the scheme of adding β to Vcth or subtracting β from Vcth is used, as described above. However, Vcth may be adjusted according to another scheme. For example, Vcth may be increased by multiplying Vcth by a number greater than 1 or Vcth may be decreased by multiplying Vcth by a number greater than 1 and less than 1.

Figure 7:
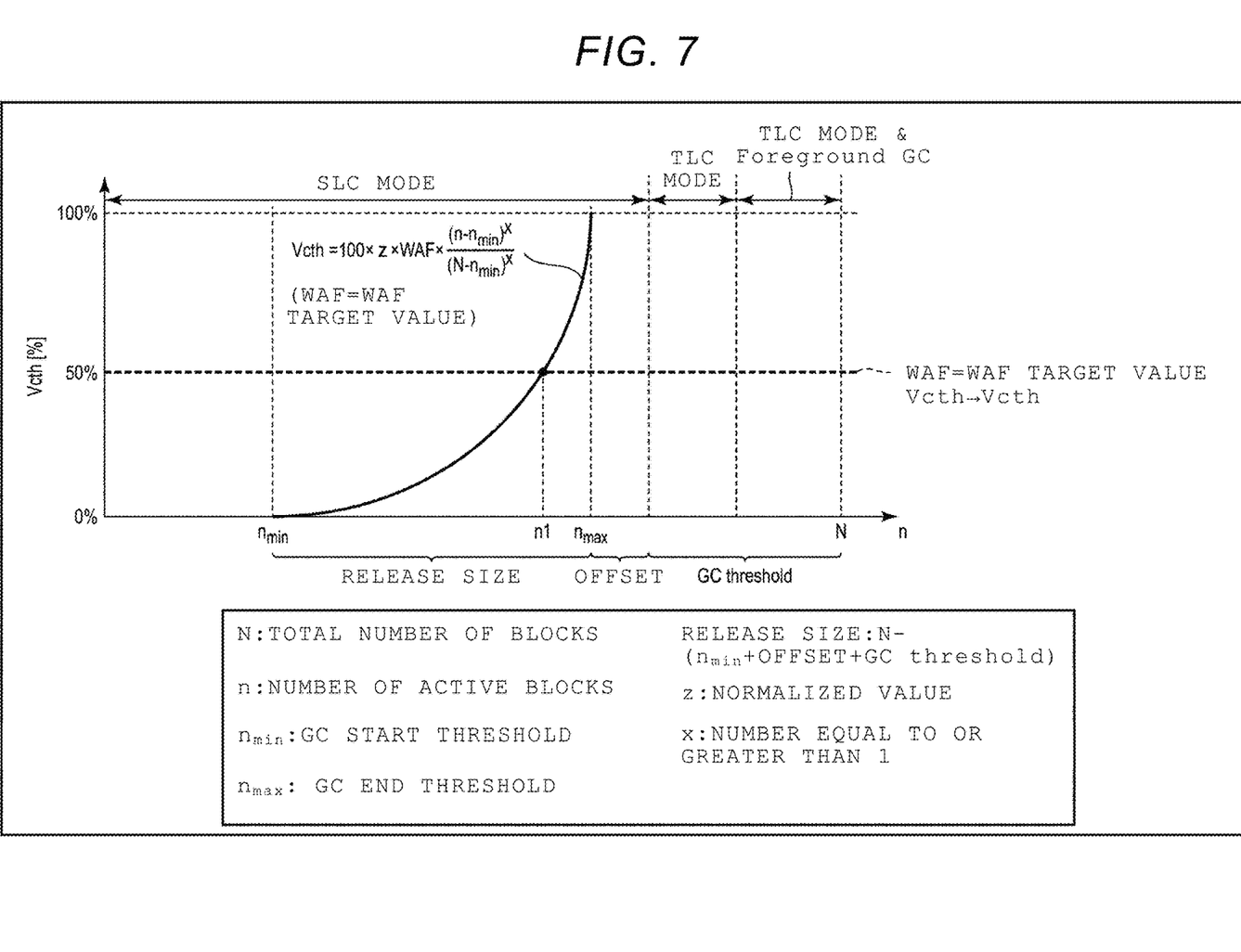
FIG. 7 is a diagram illustrating a relation between the first threshold and the number of active blocks when a write amplification (WAF) is equal to a WAF target value in the memory system according to the embodiment.

Next, Vcth will be described in each case of a result obtained by comparing the WAF with the WAF target value. FIG. 7 is a diagram illustrating a relation between the first threshold and the number of active blocks when the WAF is equal to the target value in the memory system according to the embodiment. Here, the number of active blocks in the memory system 3 is n1.

Since the WAF is equal to the WAF target value, the same curve as the curve in FIG. 6 is drawn in FIG. 7. Here, when the number of active blocks is n1, Vcth indicating 50% is calculated.

Here, since the WAF is equal to the WAF targe value, the GC control unit 423 selects a garbage collection target block using the calculated Vcth. That is, each block in which the valid data ratio is less than 50% is selected as the garbage collection target block. Then, the GC control unit 423 copies the valid data stored in each of the selected block to the copy destination block.

As such, when the WAF is equal to the WAF targe value, the controller 4 is not required to increase the total amount of data to be copied through the garbage collection operation or to inhibit the increase in the total amount of data. Therefore, the controller 4 selects the garbage collection target block using the calculated Vcth as it is without adjusting Vcth.

Figure 8:
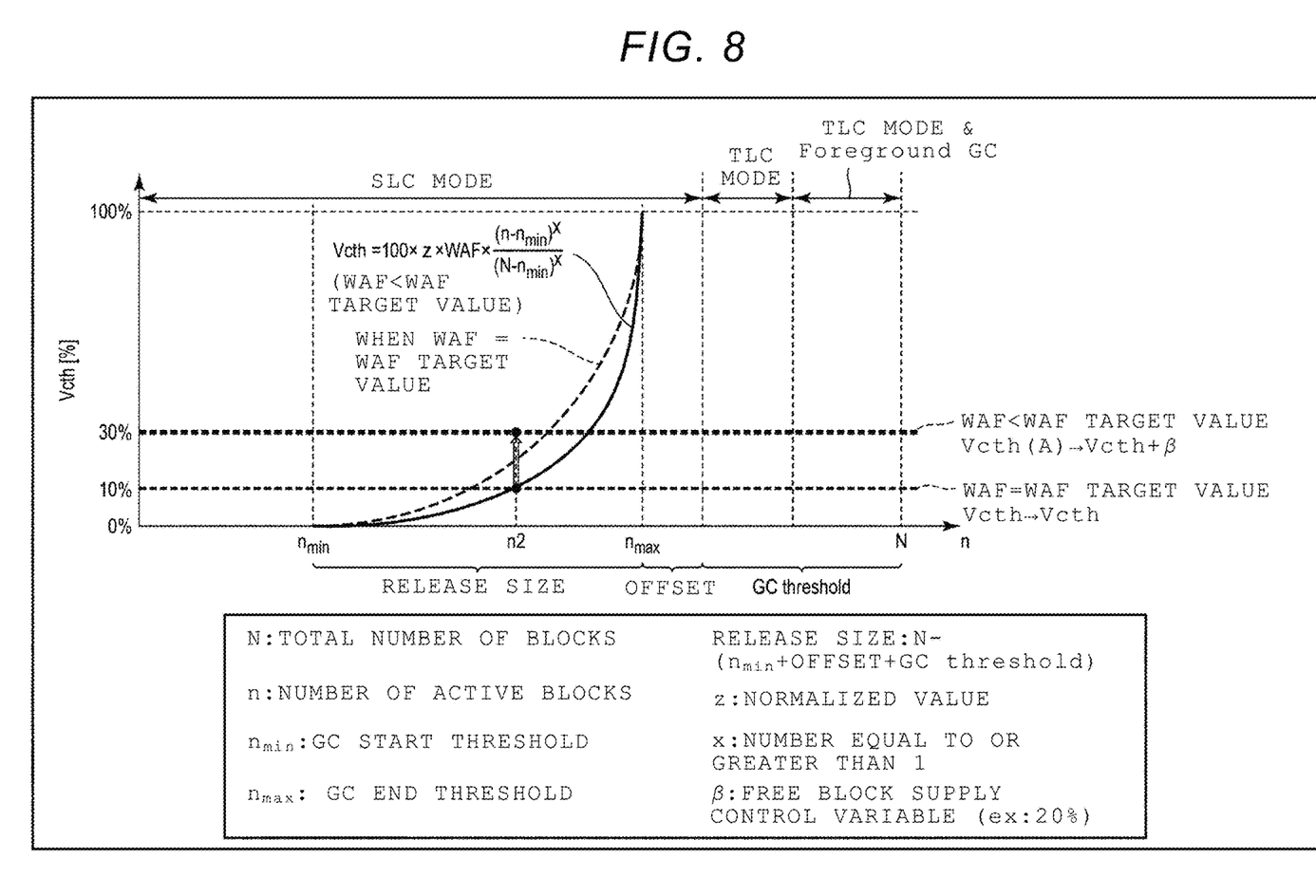
FIG. 8 is a diagram illustrating a relation between the first threshold and the number of active blocks when the WAF is less than the WAF target value in the memory system according to the embodiment.

Next, a case in which the WAF is less than the WAF target value will be described. FIG. 8 is a diagram illustrating a relation between the first threshold and the number of active blocks when the WAF is less than the target value in the memory system according to the embodiment. Here, the number of active blocks in the memory system 3 is n2.

In FIG. 8, a curved line indicating Vcth when the WAF is equal to the WAF target value is indicated by a dotted line. A curved line indicating Vcth when the WAF is less than the WAF target value is indicated by a solid line. Vcth is proportional to the WAF. Therefore, when the number of active blocks is the same, the value of the calculated Vcth is a smaller value as the WAF is smaller.

Here, when the number of active blocks is n2, Vcth indicating 10% is calculated.

Here, the GC control unit 423 adjusts Vcth so that Vcth becomes a larger value since the WAF is less than the WAF target value. Specifically, the GC control unit 423 adds 20% to the calculated Vcth. The adjusted Vcth is 30% (=10%+20%).

The GC control unit 423 selects the garbage collection target block using the adjusted Vcth. That is, the GC control unit 423 selects each block in which the valid data ratio is less than 30% as the garbage collection target block from the active blocks.

As such, the controller 4 adjusts Vcth so that Vcth becomes a larger value when the WAF is less than the WAF target value. Accordingly, the controller 4 causes the number of blocks selected as the garbage collection target blocks to be greater than when Vcth before the adjustment is used. The reason is because an increase in the total amount of data to be copied is permitted since the WAF is less than the WAF target value.

Figure 9:
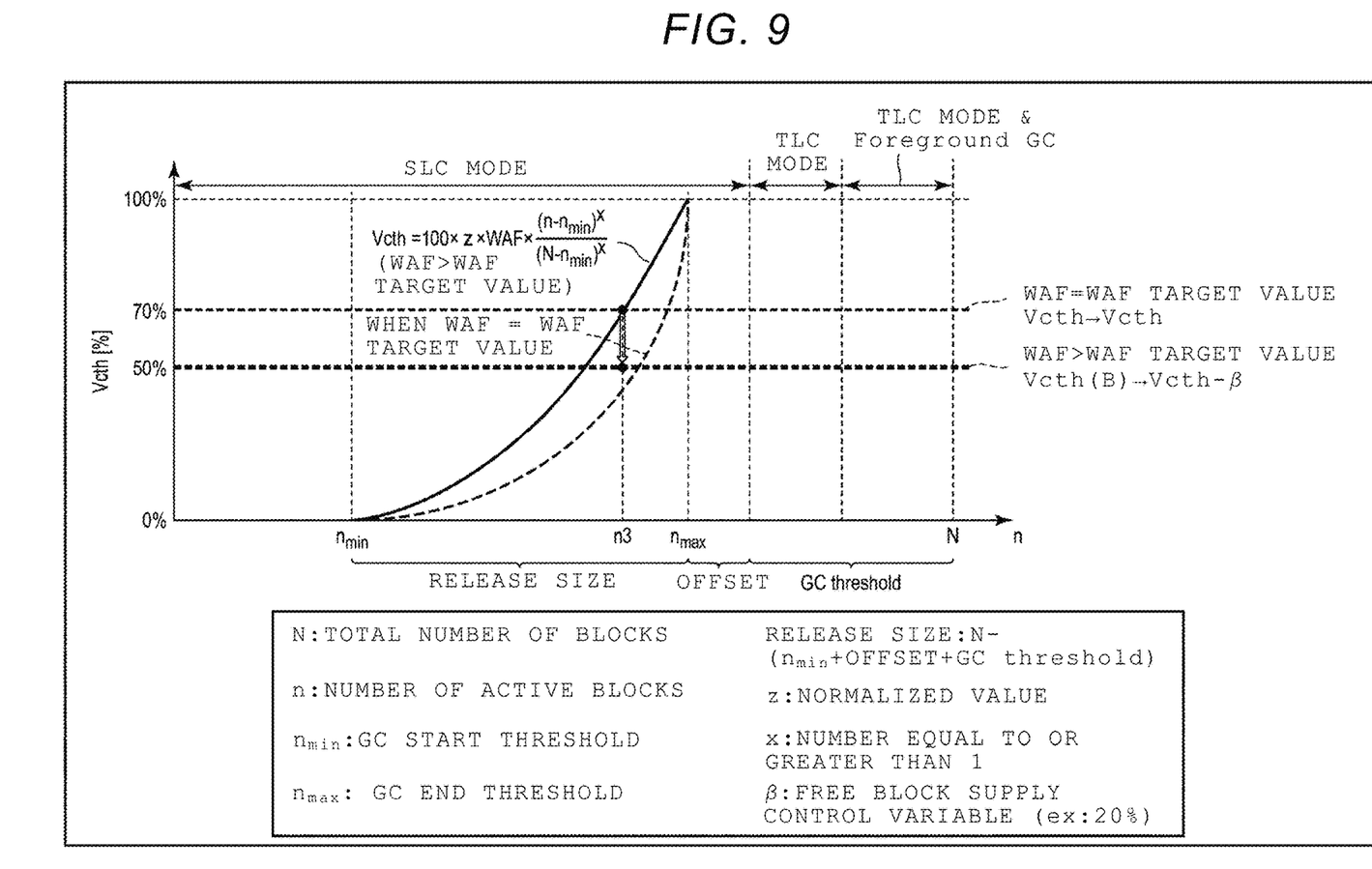
FIG. 9 is a diagram illustrating a relation between the first threshold and the number of active blocks when the WAF is greater than the WAF target value in the memory system according to the embodiment.

Next, a case in which the WAF is greater than the WAF target value will be described. FIG. 9 is a diagram illustrating a relation between the first threshold and the number of active blocks when the WAF is greater than the target value in the memory system according to the embodiment. Here, the number of active blocks in the memory system 3 is n3.

In FIG. 9, a curved line indicating Vcth when the WAF is equal to the WAF target value is indicated by a dotted line. A curved line indicating Vcth when the WAF is greater than the WAF target value is indicated by a solid line. Vcth is proportional to the WAF. Therefore, when the number of active blocks is the same, the larger the WAF is, the larger the value of Vcth is.

Here, when the number of active blocks is n3, Vcth indicating 70% is calculated.

Here, the GC control unit 423 adjusts Vcth so that Vcth becomes a smaller value since the WAF is greater than the WAF target value. Specifically, the GC control unit 423 subtracts 20% from the calculated Vcth. The adjusted Vcth is 50% (=70%-20%).

The GC control unit 423 selects the garbage collection target block using the adjusted Vcth. That is, the GC control unit 423 selects each block in which the valid data ratio is less than 50% as the garbage collection target block from the active blocks.

As such, the controller 4 adjusts Vcth so that Vcth becomes a smaller value when the WAF is greater than the WAF target value. Accordingly, the controller 4 causes the number of blocks selected as the garbage collection target blocks to be less than when Vcth before the adjustment is used. By reducing the number of blocks selected as the copy source blocks, it is possible to inhibit the increase in the WAF.

Figure 10:
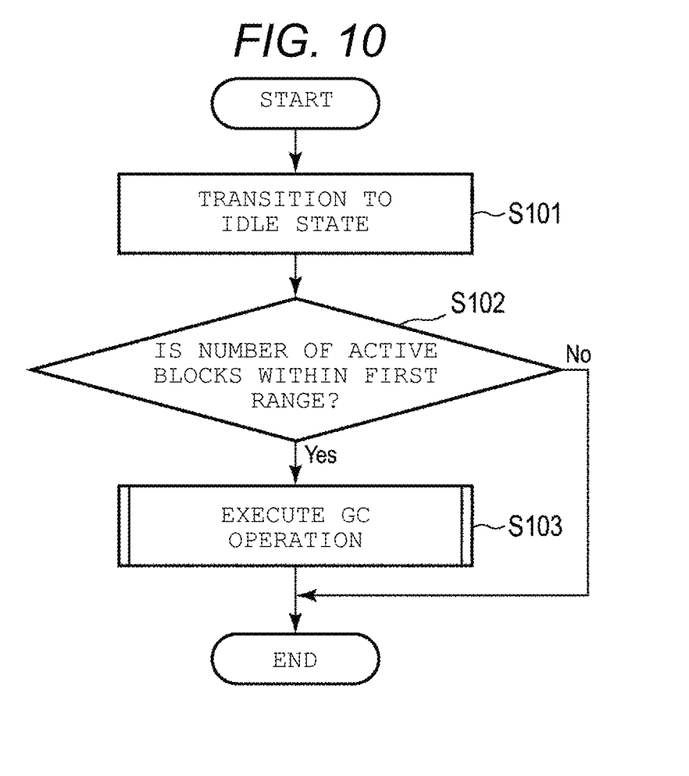
FIG. 10 is a flowchart illustrating a procedure of an idle state transition operation executed in the memory system according to the embodiment.

Next, an idle state transition operation will be described. FIG. 10 is a flowchart illustrating a procedure of an idle state transition operation executed in the memory system according to the embodiment. The controller 4 starts the idle state transition operation of causing the memory system 3 to transition to the idle state, for example, in response to non-reception of the I/O command from the host 2 for a certain time.

The controller 4 causes the memory system 3 to transition to the idle state (step S101).

The controller 4 determines whether the number of active blocks in the memory system 3 is within the first range (step S102).

When the number of active blocks is not within the first range (No in S102), the controller 4 ends the idle state transition operation.

When the number of active blocks is within the first range (Yes in S102), the controller 4 executes the garbage collection operation (step S103).

As such, the controller 4 determines whether to execute the garbage collection operation when the memory system 3 transitions to the idle state.

Figure 11:
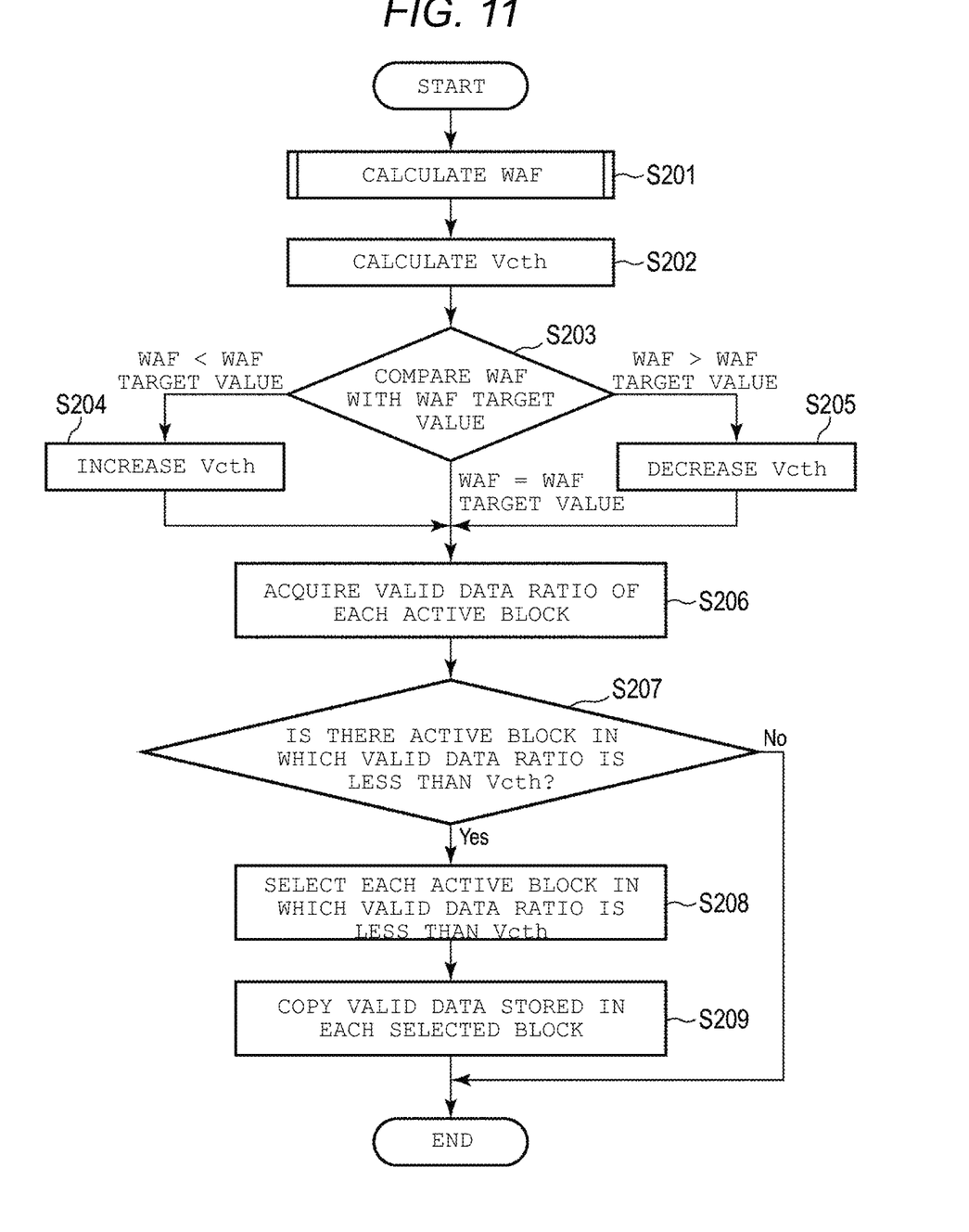
FIG. 11 is a flowchart illustrating a procedure of the garbage collection operation executed in the memory system according to the embodiment.

Next, details of the garbage collection operation in S103 of FIG. 10 will be described. FIG. 11 is a flowchart illustrating a procedure of the garbage collection operation executed in the memory system according to the embodiment. When the memory system 3 transitions to the idle state and the number of active blocks is within the first range (Yes in S102 of FIG. 10), the controller 4 starts the garbage collection operation.

The controller 4 calculates the write amplification (WAF) in the memory system 3 (step S201).

The controller 4 calculates Vcth using the WAF calculated in S201 and the number of active blocks in the memory system 3 (step S202).

The controller 4 compares the WAF calculated in S201 with the WAF target value (step S203). The WAF target value is a preset value.

When the calculated WAF is less than the WAF target value (WAF<WAF target value in S203), the controller 4 adjusts Vcth so that Vcth calculated in S202 increases (step S204). For example, the controller 4 adds β to Vcth.

When the calculated WAF is greater than the WAF target value (WAF>WAF target value in S203), the controller 4 adjusts Vcth so that Vcth calculated in S202 decreases (step S205). For example, the controller 4 subtracts β from Vcth.

When the calculated WAF is equal to the WAF target value, the controller 4 uses Vcth calculated in S202 as it is.

The controller 4 acquires the valid data ratio of each active block (step S206). For example, the controller 4 specifies the valid data ratio of each active block with reference to the active block list 62. Alternatively, the controller 4 calculates the valid data ratio with reference to each active block.

Based on the valid data ratio acquired in S206, the controller 4 determines whether there is an active block in which the valid data ratio is less than Vcth (step S207).

When there is no active block in which the valid data ratio is less than Vcth (No in S207), the controller 4 ends the garbage collection operation.

When there is an active block in which the valid data ratio is less than Vcth (Yes in S207), the controller 4 selects each active block in which the valid data ratio is less than Vcth as the garbage collection target block (step S208).

The controller 4 copies the valid data stored in each block selected in S208 to the copy destination block (step S209) Accordingly, each block selected in S208 is set to a free block in which valid data is not stored.

Accordingly, the controller 4 calculates Vcth based on the WAF of the memory system 3 and the number of active blocks. The controller 4 adjusts the value of Vcth based on a comparison result between the WAF and the WAF target value. The controller 4 selects the garbage collection target block using the adjusted Vcth. Accordingly, the controller 4 can control an amount of data to be copied through the garbage collection operation according to the WAF of the memory system 3 and the number of active blocks.

Figure 12:
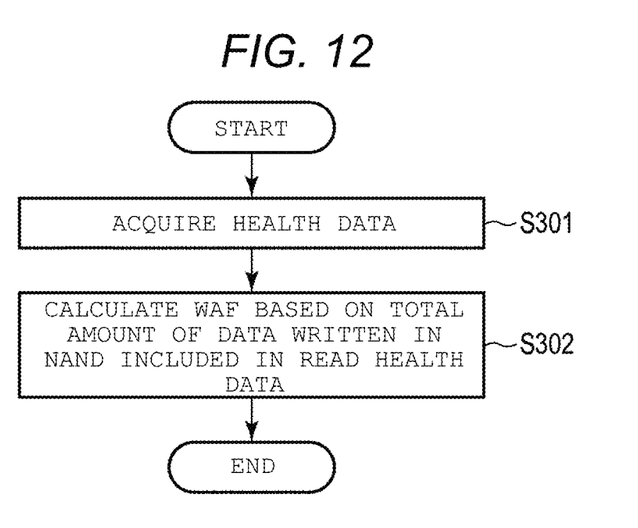
FIG. 12 is a flowchart illustrating a procedure of a WAF calculation operation executed in the memory system according to the embodiment.

Next, details of an operation of calculating the WAF in S201 of FIG. 11 will be described. FIG. 12 is a flowchart illustrating a procedure of a WAF calculation operation executed in the memory system according to the embodiment. The controller 4 starts the WAF calculation operation when the garbage collection operation starts.

The controller 4 reads health data from the NAND flash memory 5 (step S301).

The controller 4 calculates the WAF based on a total amount of data written in the NAND flash memory 5 included in the health data read in S301 (step S302). Specifically, the controller 4 calculates the WAF by dividing a total amount of data written in the NAND flash memory 5 based on a request from the host 2 by a total amount of data written in the NAND flash memory 5. The total amount of data written in the NAND flash memory 5 based on the request from the host 2 may be included, for example, in the health data read in S301.

Accordingly, the controller 4 calculates the WAF of the memory system 3 when the garbage collection operation is executed.

As described above, according to the embodiment, the controller 4 starts the garbage collection operation when the memory system 3 transitions to the idle state and the number of active blocks is within the first range. When the garbage collection operation starts, the controller 4 calculates the WAF and Vcth. Then, the controller 4 adjusts the calculated Vcth based on the comparison result between the calculated WAF and the WAF target value. The controller 4 selects each block in which the valid data ratio is less than the adjusted Vcth among the active blocks and sets the selected blocks to free blocks by copying the valid data stored in each of the selected blocks. Accordingly, the controller 4 can appropriately execute the garbage collection operation based on the WAF of the memory system 3 and the number of active blocks. For example, when Vcth is 30%, the controller 4 selects only the blocks in which the valid data ratio is less than 30% and sets the selected blocks to free blocks by copying the valid data stored in the selected blocks. Accordingly, it is possible to control the amount of data to be copied and inhibit an increase in the WAF.

Specifically, since Vcth is an exponential function of the number of active blocks within the first range, the controller 4 selects more blocks as the garbage collection target blocks as the number of active blocks increases. Therefore, the controller 4 can control the garbage collection operation so that the number of free blocks is more recovered as the number of active blocks is larger.

The controller 4 adjusts Vcth so that Vcth becomes a larger value when the WAF of the memory system 3 is less than the WAF target value. Accordingly, the controller 4 can increase the number of free blocks to be supplied through the garbage collection operation. The controller 4 can adjust the WAF closer to the WAF target value by increasing the WAF as more pieces of data are copied.

The controller 4 adjusts Vcth so that Vcth becomes a smaller value when the WAF is greater than the WAF target value. Accordingly, the controller 4 can inhibit the number of free blocks to be supplied through the garbage collection operation. The controller 4 can adjust the WAF closer to the WAF target value by decreasing the amount of data to be copied.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host, the memory system comprising:
    a nonvolatile memory including a plurality of blocks, each of the blocks being a unit of a data erasing operation; and
    a controller coupled to the nonvolatile memory and configured to control the nonvolatile memory and execute a garbage collection operation, wherein
    when the controller executes the garbage collection operation,
    the controller is configured to:
    calculate a write amplification indicating a ratio of a total amount of data written in the nonvolatile memory to a total amount of data written in the nonvolatile memory that is responsive to a request from the host,
    calculate a first threshold that changes as a number of first blocks changes based on a number of first blocks storing at least valid data,
    increase the first threshold when the calculated write amplification is less than a target value of the write amplification, and decrease the first threshold when the calculated write amplification is greater than the target value,
    determine a valid data ratio indicating a ratio of a total amount of valid data to a total amount of data that is able to be stored in one block for each of the first blocks,
    select each block with the corresponding valid data ratio less than the first threshold from the first blocks, and
    set each of the selected blocks to a free block by copying valid data stored in each of the selected blocks to a copy destination block.

2. The memory system according to claim 1, wherein the controller is configured to execute a data erasing operation on each of the selected blocks for which copying is completed in the garbage collection operation.

3. The memory system according to claim 1, wherein the controller is configured to execute the garbage collection operation when the memory system transitions to an idle state.

4. The memory system according to claim 3, wherein, when the memory system transitions to the idle state, the controller is configured to:
    execute the garbage collection operation when the number of first blocks is within a first range, and not execute the garbage collection operation when the number of first blocks is not within the first range.

5. The memory system according to claim 1, wherein the controller is configured to:
start a garbage collection operation different from the garbage collection operation when the number of free blocks becomes less than a second threshold, and
when the controller executes the different garbage collection operation,
select a block in which the valid data ratio is low among the first blocks, and
copy valid data stored in the selected block to a copy destination block.

6. The memory system according to claim 1, wherein the controller is configured to:
read management information from the nonvolatile memory, and
calculate the write amplification using a total amount of data written in the nonvolatile memory included in the management information.

7. The memory system according to claim 1, wherein the controller is configured to calculate the first threshold based on a value calculated by multiplying the write amplification by a number obtained by dividing a power of the number of first blocks that has a number equal to or greater than 1 as an exponent by a power of the number of the plurality of blocks that has a number equal to or greater than 1 as an exponent.

8. The memory system according to claim 1, wherein the controller is configured to:
decrease the first threshold by subtracting a second value from the calculated first threshold when the calculated write amplification is less than the target value, and
increase the first threshold by adding a third value to the calculated first threshold when the calculated write amplification is greater than the target value.

9. The memory system according to claim 8, wherein the second value and the third value are equal to each other.

10. A control method of controlling a memory system including a nonvolatile memory including a plurality of blocks that are each a unit of a data erasing operation, the method comprising:
executing a garbage collection operation on the nonvolatile memory, wherein
the execution of the garbage collection operation includes:
calculating a write amplification indicating a ratio of a total amount of data written in the nonvolatile memory to a total amount of data written in the nonvolatile memory that is responsive to a request from the host
calculating a first threshold that increases as a number of first blocks increases based on a number of first blocks storing at least valid data,
increasing the first threshold when the calculated write amplification is less than a target value of the write amplification, and decreasing the first threshold when the calculated write amplification is greater than the target value,
specifying a valid data ratio indicating a ratio of a total amount of valid data to a total amount of data that is able to be stored in one block for each of the first blocks,
selecting each block with the corresponding valid data ratio less than the first threshold from the first blocks, and
setting each of the selected blocks to a free block by copying valid data stored in each of the selected blocks to a copy destination block.

11. The control method according to claim 10, further comprising executing a data erasing operation on each of the selected blocks for which copying is completed in the garbage collection operation.

12. The control method according to claim 10, further comprising executing the garbage collection operation when the memory system transitions to an idle state.

13. The control method according to claim 12, further comprising:
executing the garbage collection operation when the number of first blocks is within a first range, and
not executing the garbage collection operation when the number of first blocks is not within the first range.

14. The control method according to claim 10, further comprising:
starting a garbage collection operation different from the garbage collection operation when the number of free blocks becomes less than a second threshold,
selecting a block in which the valid data ratio is low among the first blocks, and
copying valid data stored in the selected block to a copy destination block.

15. The control method according to claim 10, further comprising:
reading management information from the nonvolatile memory; and
calculating the write amplification using a total amount of data written in the nonvolatile memory included in the management information.

16. The control method according to claim 10, further comprising:
calculating the first threshold based on a value calculated by multiplying the write amplification by a number obtained by dividing a power of the number of first blocks that has a number equal to or greater than 1 as an exponent by a power of the number of the plurality of blocks that has a number equal to or greater than 1 as an exponent.

17. The control method according to claim 10, further comprising:
decreasing the first threshold by subtracting a second value from the calculated first threshold when the calculated write amplification is less than the target value, and
increasing the first threshold by adding a third value to the calculated first threshold when the calculated write amplification is greater than the target value.

18. The control method according to claim 17, wherein the second value and the third value are equal to each other.

* * * * *